United States Patent
Tazebay et al.

(10) Patent No.: US 8,300,655 B2
(45) Date of Patent: Oct. 30, 2012

(54) SYSTEM AND METHOD FOR DYNAMIC POWER CONTROL FOR ENERGY EFFICIENT PHYSICAL LAYER COMMUNICATION DEVICES

(75) Inventors: Mehmet Tazebay, Irvine, CA (US); Scott Powell, Alisa Viejo, CA (US); Peiqing Wang, Irvine, CA (US)

(73) Assignee: Broadcom Corporation, Irvine, CA (US)

( * ) Notice: Subject to any disclaimer, the term of this patent is extended or adjusted under 35 U.S.C. 154(b) by 395 days.

(21) Appl. No.: 12/651,446

(22) Filed: Jan. 1, 2010

(65) Prior Publication Data

US 2011/0026416 A1 Feb. 3, 2011

Related U.S. Application Data

(60) Provisional application No. 61/230,136, filed on Jul. 31, 2009.

(51) Int. Cl.
*H04L 12/413* (2006.01)
(52) U.S. Cl. .................................................. 370/445
(58) Field of Classification Search .......... 370/252, 370/278, 282, 311, 445, 463, 522
See application file for complete search history.

(56) References Cited

U.S. PATENT DOCUMENTS

| | | | | |
|---|---|---|---|---|
| 7,920,597 | B2 * | 4/2011 | Conway et al. | 370/503 |
| 7,930,373 | B2 * | 4/2011 | Diab | 709/220 |
| 8,107,365 | B2 * | 1/2012 | Barrass | 370/229 |
| 2008/0225841 | A1 | 9/2008 | Conway et al. | |
| 2009/0204828 | A1 * | 8/2009 | Diab et al. | 713/320 |
| 2009/0282277 | A1 * | 11/2009 | Sedarat et al. | 713/320 |

OTHER PUBLICATIONS

IEEE Draft P802.3az™/D2.1, Part 3: Carrier Sense Multiple Access with Collision Detection (CSMA/CD) Access Method and Physical Layer Specifications, 247 pages, Nov. 2009.*

* cited by examiner

*Primary Examiner* — Frank Duong
(74) *Attorney, Agent, or Firm* — Duane S. Kobayashi

(57) ABSTRACT

A system and method for dynamic power control for energy efficient physical layer communication devices. Energy-efficiency features are continually being developed to conserve energy in links between such energy-efficient devices. These energy-efficient devices interoperate with many legacy devices that have already been deployed. In these links, energy savings can be produced by having a local receiver enter an energy saving state based upon the receipt of standard IDLE signals.

15 Claims, 5 Drawing Sheets

SYSTEM AND METHOD FOR DYNAMIC POWER CONTROL FOR ENERGY EFFICIENT PHYSICAL LAYER COMMUNICATION DEVICES

This application claims priority to provisional application No. 61/230,136, filed Jul. 31, 2009, which is incorporated by reference herein, in its entirety, for all purposes.

BACKGROUND

Field of the Invention

The present invention relates generally to energy efficient Ethernet networks and, more particularly, to a system and method for dynamic power control for energy efficient physical layer communication devices.

INTRODUCTION

Energy costs continue to escalate in a trend that has accelerated in recent years. Such being the case, various industries have become increasingly sensitive to the impact of those rising costs. One area that has drawn increasing scrutiny is the IT infrastructure. Many companies are now looking at their IT systems' power usage to determine whether the energy costs can be reduced. For this reason, an industry focus on energy efficient networks has arisen to address the rising costs of IT equipment usage as a whole (i.e., PCs, displays, printers, servers, network equipment, etc.).

In designing an energy efficient solution, one of the considerations is the traffic profile on the network link. For example, many network links are typically in an idle state between sporadic bursts of data, while in other network links, there can be regular or intermittent low-bandwidth traffic, with bursts of high-bandwidth traffic. An additional consideration for an energy efficient solution is the extent to which the traffic is sensitive to buffering and latency. For example, some traffic patterns (e.g., HPC cluster or high-end 24-hr data center) are very sensitive to latency such that buffering would be problematic.

For these and other reasons, applying energy efficient concepts to different traffic profiles would lead to different solutions. These varied solutions can therefore seek to adapt the link, link rate, and layers above the link to an optimal solution based on various energy costs and impact on traffic, which itself is dependent on the application. In providing an energy-efficient solution that properly addresses the various competing considerations, what is needed is a system and method for dynamic power control for energy efficient physical layer communication devices.

SUMMARY

A system and/or method for dynamic power control for energy efficient physical layer communication devices, substantially as shown in and/or described in connection with at least one of the figures, as set forth more completely in the claims.

BRIEF DESCRIPTION OF THE DRAWINGS

In order to describe the manner in which the above-recited and other advantages and features of the invention can be obtained, a more particular description of the invention briefly described above will be rendered by reference to specific embodiments thereof which are illustrated in the appended drawings. Understanding that these drawings depict only typical embodiments of the invention and are not therefore to be considered limiting of its scope, the invention will be described and explained with additional specificity and detail through the use of the accompanying drawings in which.

DETAILED DESCRIPTION

Various embodiments of the invention are discussed in detail below. While specific implementations are discussed, it should be understood that this is done for illustration purposes only. A person skilled in the relevant art will recognize that other components and configurations may be used without parting from the spirit and scope of the invention.

Energy Efficient Ethernet (EEE) networks attempt to save power when the traffic utilization of the network is not at its maximum capacity. This serves to minimize the performance impact while maximizing energy savings. At a broad level, the EEE control policy for a particular link in the network determines when to enter an energy saving state, what energy saving state (i.e., level of energy savings) to enter, how long to remain in that energy saving state, what energy saving state to transition to out of the previous energy saving state, etc. EEE control policies can base these decisions on a combination of static settings established by an IT manager and the properties of the traffic on the link itself.

Figure 1:
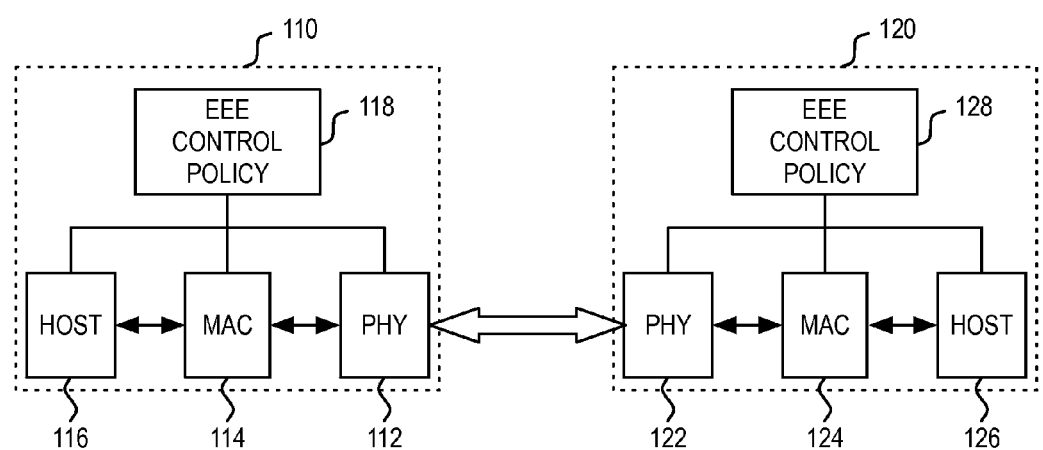
FIG. 1 illustrates an Ethernet link between link partners in an energy efficient Ethernet network.

FIG. 1 illustrates an example link to which an EEE control policy can be applied. As illustrated, the link supports communication between a first link partner 110 and a second link partner 120. In various embodiments, link partners 110 and 120 can represent a switch, router, endpoint (e.g., server, client, VOIP phone, wireless access point, etc.), or the like. As would be appreciated, the link can operate at standard or non-standard (e.g., 2.5G, 5G, 10G, etc.) link rates, as well as future link rates (e.g., 40G, 100G, etc.). The link can also be supported by various port types (e.g., backplane, twisted pair, optical, etc.) and in various applications (e.g., Broadreach Ethernet, EPON, etc.).

As illustrated, link partner 110 includes physical layer device (PHY) 112, media access control (MAC) 114, and host 116, while link partner 120 includes PHY 122, MAC 124, and host 126.

In general, hosts 116 and 126 may comprise suitable logic, circuitry, and/or code that may enable operability and/or functionality of the five highest functional layers for data packets that are to be transmitted over the link. Since each layer in the OSI model provides a service to the immediately higher interfacing layer, MACs 114 and 124 may provide the necessary services to hosts 116 and 126 to ensure that packets are suitably formatted and communicated to PHYs 112 and 122. MACs 114 and 124 may comprise suitable logic, circuitry, and/or code that may enable handling of data link layer (Layer 2) operability and/or functionality. MACs 114 and 124 can be configured to implement Ethernet protocols, such as those based on the IEEE 802.3 standard, for example. PHYs 112 and 122 can be configured to handle physical layer requirements, which include, but are not limited to, packetization, data transfer and serialization/deserialization (SERDES).

In general, controlling the data rate of the link may enable link partners 110 and 120 to communicate in a more energy-efficient manner. More specifically, a reduction in link rate to a sub-rate of the main rate enables a reduction in power, thereby leading to energy savings. In one example, this sub-rate can be a zero rate, which produces maximum power savings.

One example of subrating is through the use of a subset PHY technique. In this subset PHY technique, a low link utilization period can be accommodated by transitioning the PHY to a lower link rate that is enabled by a subset of the parent PHY. In one embodiment, the subset PHY technique is enabled by turning off portions of the parent PHY to enable operation at a lower or subset rate. For example, a subset 1G PHY can be created from a parent 10G PHY by a process that turns off three of the four channels. In another embodiment, the subset PHY technique is enabled by slowing down the clock rate of a parent PHY. For example, a parent PHY having an enhanced core that can be slowed down and sped up by a frequency multiple can be slowed down by a factor of 10 during low link utilization, then sped up by a factor of 10 when a burst of data is received. In this example of a factor of 10, a 10G enhanced core can be transitioned down to a 1G link rate when idle, and sped back up to a 10G link rate when data is to be transmitted.

Another example of subrating is through the use of a low power idle (LPI) technique. In general, LPI relies on turning the active channel silent when there is nothing to transmit. Energy is thereby saved when the link is off. Refresh signals can be sent periodically to enable wake up from the sleep mode. In one embodiment, a sync signal can be used on the interfaces (i.e., medium dependent interface (MDI) and MAC/PHY interface) to allow for a quick wake up from the sleep mode and maintain frequency lock. For example, on the MDI interface for a 10GBASE-T signal, a simple PAM2 pseudorandom bit sequence could be used on pair A during LPI mode. This would not significantly increase the power that is consumed.

In general, both the subset and LPI techniques involve turning off or otherwise modifying portions of the PHY during a period of low link utilization. As in the PHY, power savings in the higher layers (e.g., MAC) can also be achieved by using various forms of subrating as well.

As FIG. 1 further illustrates, link partners 110 and 120 also include EEE control policy entities 118 and 128, respectively. In general, EEE control policy entities 118 and 128 can be designed to determine when to enter an energy saving state, what energy saving state (i.e., level of energy savings) to enter, how long to remain in that energy saving state, what energy saving state to transition to out of the previous energy saving state, etc.

EEE control policy entities 118 and 128 can comprise suitable logic, circuitry, and/or code that may be enabled to establish and/or implement an EEE control policy for the network in which the link resides. In various embodiments, EEE control policy entities 118 and 128 can be a logical and/or functional block which may, for example, be implemented in one or more layers, including portions of the PHY or enhanced PHY, MAC, switch, controller, or other subsystems in the host.

EEE control policy entities 118 and 128 can be enabled to analyze traffic on the physical link and to analyze operations and/or processing of data in link partners 110 and 120. In this manner, EEE control policy entities 118 and 128 may exchange information from, or pertaining to, one or more layers of the OSI hierarchy in order to establish and/or implement the EEE control policy.

EEE control policy entities 118 and 128 can be designed to cooperate with each other in signaling their own energy saving actions as well as responding to their link partner's energy saving actions. In combination, the signaling by the link partners can conserve energy on both ends of the link in a coordinated manner when the link utilization is low. In general, EEE control policy entities 118 and 128 are designed to leverage energy saving states that have been incorporated into the designs of the PHY, MAC, etc.

Due to the significant energy saving benefits that can be achieved using energy saving states, there exists a general industry trend in incorporate various energy saving features into various system components (e.g., PHY, MAC, etc.). Where the energy saving enabling features (e.g., energy saving states, signaling, etc.) are standardized or commonly supported, there can be a cooperation between devices manufactured by different vendors in producing energy savings on a particular link. Where the energy saving enabling features are not standardized or commonly supported between a pair of devices, however, energy savings on a link cannot be leveraged even if one of the link partners could otherwise includes support for some form of energy savings.

Figure 2:
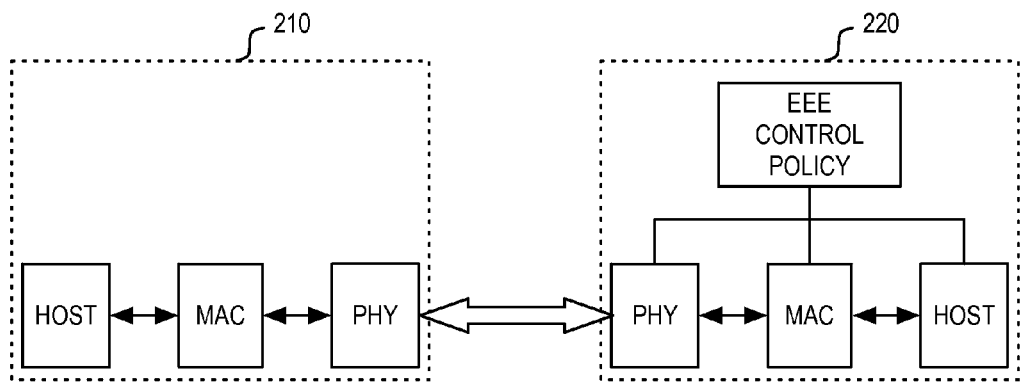
FIG. 2 illustrates an example of an Ethernet link having one legacy physical layer communication device.

FIG. 2 illustrates such an example. As illustrated, link partner 220 supports some form of energy savings, while link partner 210 does not. Thus, notwithstanding the capabilities of link partner 220, the energy savings on the link are limited.

One common example of such a scenario is where a first link partner includes energy saving features and a second link partner is a legacy device that does not include energy saving features. This scenario is common due to the large installed base of legacy devices. Notwithstanding the growing trend of incorporating energy saving features into new generations of devices, the level of penetration of that new generation of devices will proceed slowly in accordance with the replacement rates of existing legacy devices.

Recognizing that link partners may not commonly support a set of energy saving features, it is a feature of the present invention that energy savings can be produced asymmetrically across the link. More specifically, the principles of the present invention provide an energy efficiency control mechanism for a PHY that interoperates with systems that may not have been designed and manufactured for energy efficiency, or may not have been designed and manufactured for energy efficiency in cooperation with that PHY.

The principles of the present invention enable PHYs to leverage available information for the established link to provide a robust dynamic power down control mechanism for energy efficiency during the absence of data, video and/or audio traffic. In current PHY implementations, the power dissipation is independent of the link utilization. This results because the transmission of IDLE signals when no traffic is being transmitted consumes a significant amount of power.

Figure 3:
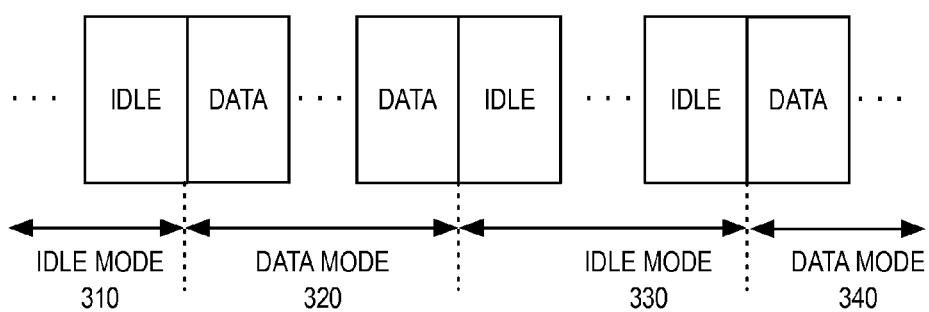
FIG. 3 illustrates an example of a transition between data and idle modes on an Ethernet link.

FIG. 3 illustrates an example of the transmission of IDLE signals on a link. In general, data transmitted and/or received by a PHY can be formatted in accordance with the well-known OSI protocol standard. The data transmitted can comprise frames of Ethernet media independent interface (MII) data (e.g., data modes 320, 340), which may be delimited by start of stream and end of stream delimiters, for example. The data transmitted can include IDLE signals (e.g., idle modes 310, 330) that may be communicated between frames of data. Conventionally, IDLE signals are used to keep link partners synchronized between frames of actual data. IEEE standard IDLE signals are formatted in a manner very similar to real data. Thus, as noted, the transmission of IDLE signals would still consume a significant amount of power.

In the present invention, it is recognized that asymmetric energy savings can be achieved on a link based on an analysis of link-related parameters. For example, the local receiver can be powered down whenever the remote PHY is transmitting idle sequences (i.e., no data content being transmitted). The receiver can then be powered up again when non-idle signals are detected from the remote PHY. With this energy efficiency framework, the power dissipation of the local PHY would be reduced in proportion to the link utilization. Accordingly, a PHY connected to a link with low average utilization, which is typical in many Ethernet links, would have lower average power dissipation. Significantly, these energy savings would be achieved when the PHY was paired with a legacy PHY device that was not designed for energy efficiency.

Figure 4:
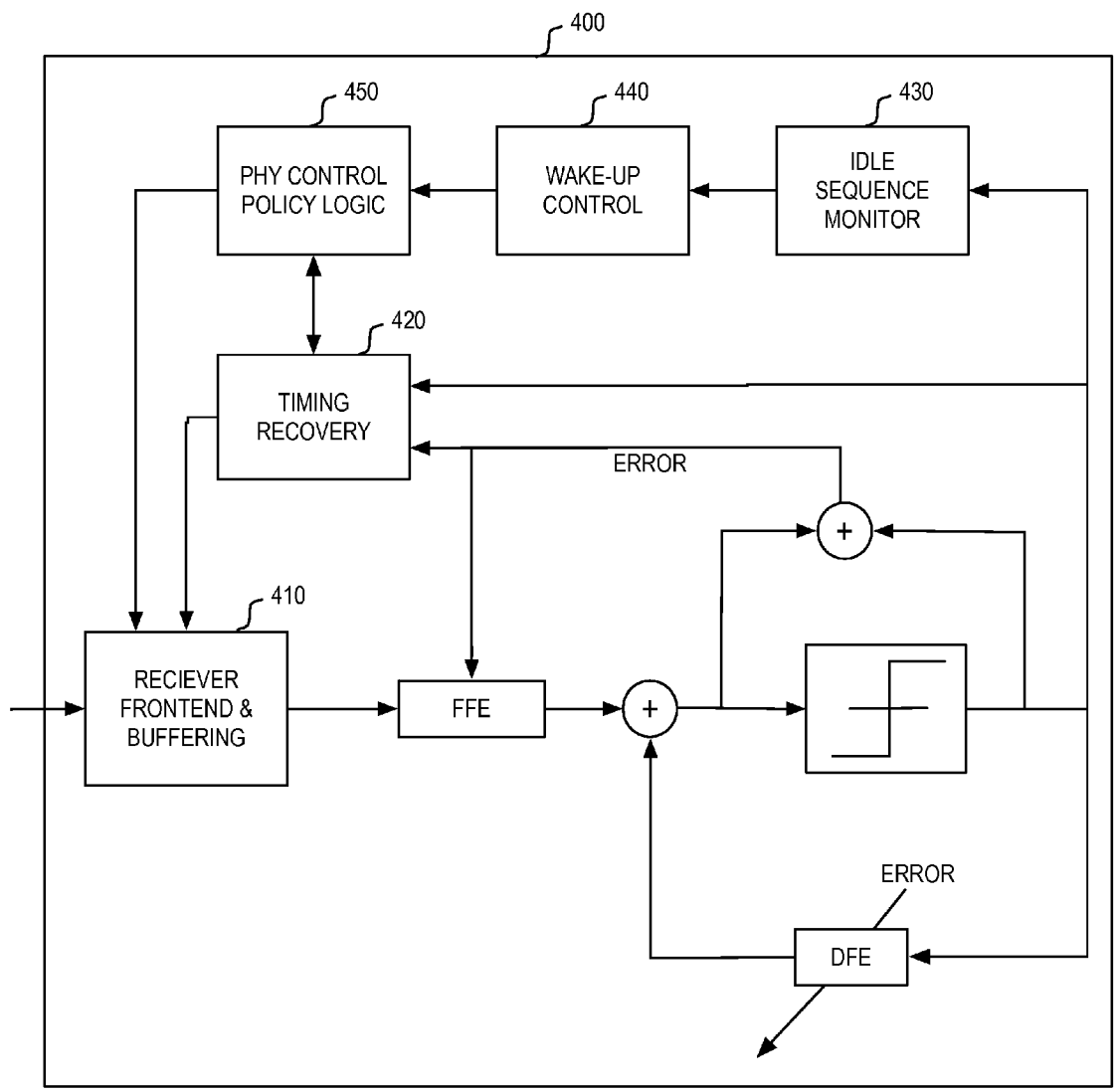
FIG. 4 illustrates an example of a physical layer communication device having a dynamic power control mechanism.

FIG. 4 illustrates an embodiment of such an energy efficiency mechanism that can be incorporated in the baseband portion of a transceiver. As illustrated, transceiver 400 includes receiver front end and buffering 410 that feeds an equalization stage, which includes a feed forward equalizer (FFE) and a decision feedback equalizer (DFE). The feedback and results of the equalization stage are also fed back to timing recovery 420, which extracts a timing signal from the embedded clock in the received signal. As would be appreciated, the principles of the present invention are not limited to the particular form of the example transceiver illustrated in FIG. 4.

As further illustrated, transceiver 400 also includes idle sequence monitor 430. Idle sequence monitor 430 is designed to monitor the received signals to identify the receipt of IDLE signals that are transmitted by the remote device. As noted, when the remote device does not have any data to transmit, the remote device will transmit IDLE signals on the link. These IDLE signals can be standard IDLE signals and need not be specialized idle signals (e.g., low-power idle signals).

These standard IDLE signals can be monitored using a programmable threshold to determine when an idle mode should be signaled. The signaling of such an idle mode can then be used to determine when the local receiver should enter a sleep mode for a programmable time period.

In one embodiment, the programmable thresholds can be determined by using fuzzy logic for self-adaptation to thereby increase the energy efficiency. This adaptation mechanism can be governed by PHY control policy logic 450, which can utilize preliminary networks statistics. These network statistics can be continually updated to reflect changes in link utilization. Further, sleep statistics can be tracked to provide an indication of the success of the sleep mode. For example, sleep statistics such as the number of energy saving events, the length of each energy saving event, the total time in an energy saving state during a measurable time period, etc. can be tracked. These sleep statistics can also be used to increase or decrease the programmable thresholds and time periods to improve energy efficiency. In further examples, the network statistics can include statistics regarding time of day usage (e.g., overnight usage versus working-day usage), usage statistics for a particular device, user, etc., statistics regarding particular types of communication, statistics regarding a likelihood of when a channel is to be up (e.g., refresh cycle), etc. In general, any explicit identification or a statistic that indicates relative activity on the link can be used by the control policy.

Returning to FIG. 4, transceiver 400 also includes wake-up control 440. In general, wake-up control 440 is designed to determine when the local receiver goes to sleep (i.e., enters an energy saving state), periodically refreshes (i.e., updates the channel parameters), and/or wakes up from the energy saving state. These decisions by wake-up control 440 are provided to PHY control policy logic 450, which implements the state control in the local receiver.

It is a feature of the present invention that transceiver 400 can produce energy savings in the local receiver without compromising the established link with the remote link partner. As would be appreciated, maintaining the established link may require continuous signaling. Accordingly, in one embodiment, the local transmitter is maintained in an operational state to ensure that the remote link partner's local receiver status is maintained in a functional state.

When a non-IDLE or data traffic is detected, wake-up control 440 can then transition the local receiver from the energy saving state to an active state. As would be appreciated, the particular analog and digital circuitry within the local receiver path (RX channel) that is powered down during an energy saving state would be implementation dependent. The implementation dependent energy saving states would therefore require different amounts of time to transition from the energy saving state to the active state. These variations can be accommodated by different amounts of buffering in the receiver path to ensure that traffic is not lost and that latency requirements are accommodated. Buffering may not be needed in all cases.

In the example of a four-pair full duplex Ethernet transceiver, an energy saving state can be defined where all four receiver channels are powered down. Alternatively, an energy saving state can be defined where one local receiver channel remains powered and the three other local receiver channels are powered down. This energy saving state can represent an example of a subset PHY mode, which can improve the tracking capability of the channel parameters. An advantage of this energy saving state is that one channel can be used to detect the non-IDLE. Thus, the PHY can be awoken quicker due to the tracking capability of the channel parameters, and the size of the required buffering in the receiver path can be reduced.

Figure 5:
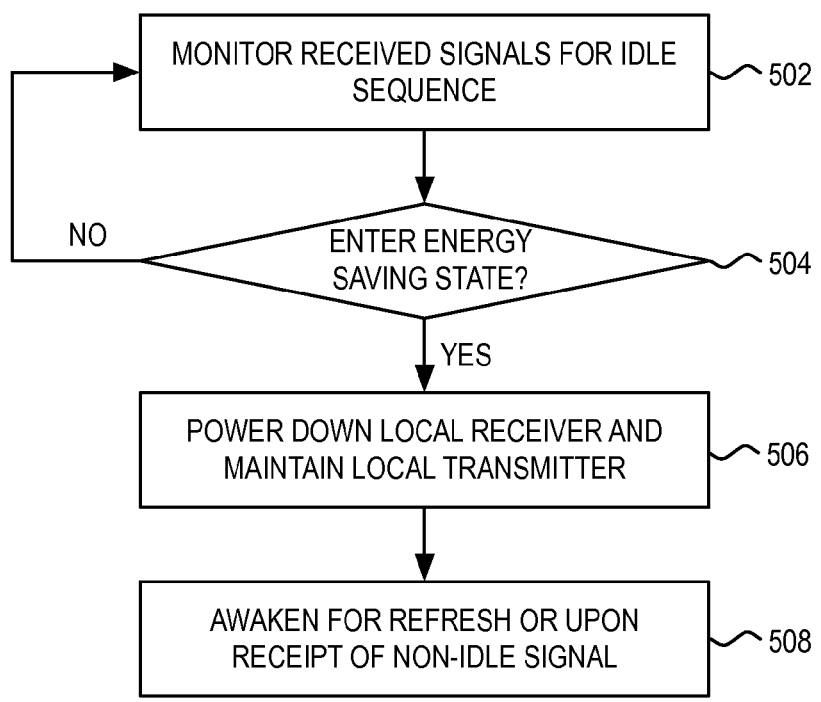
FIG. 5 illustrates a flowchart of a process of the present invention.

To further illustrate the process of the present invention, reference is now made to the flowchart of FIG. 5. As illustrated, the process begins at step 502 where the transceiver monitors signals received from a remote link partner for an IDLE sequence. In general, the receipt of IDLE signals provide an indication that the remote link partner has transitioned to an idle mode. Where the remote link partner is a legacy device that is not configured for energy efficiency, then the IDLE sequence can be a standard Ethernet IDLE signal that is transmitted between Ethernet frames. These IDLE signals are not designed to produce energy efficiency in the remote link partner.

Their receipt at the local receiver, on the other hand, can be leveraged to produce energy savings. Here, a decision is made at step 504 whether to have the local receiver enter into an energy saving state. As would be appreciated, IDLE signals can be transmitted between Ethernet frames. If the traffic is truly bursty, then the time in the idle mode can be substantial and large energy savings are possible. If the traffic is not-bursty, however, then the entry by the local receiver into an energy saving state can be ineffective from an energy efficiency standpoint.

To promote energy efficiency, this decision to enter an energy saving state can be based on thresholds (e.g., time in idle mode) that can be determined by an analysis of network and/or sleep statistics by an EEE control policy that implements fuzzy logic. In general, the thresholds can be adapted based on defined statistics to ensure that an entry into an energy saving state is more likely to be effective in producing energy savings at the local receiver.

If it is determined at step 504 that the energy saving state should not be entered, then the receiver would continue to monitor the receipt of IDLE signals at step 502. If, on the other hand, it is determined at step 504 that the energy saving state should be entered, then the process continues to step 506 where a PHY control policy logic would power down analog and/or digital circuitry in the local receiver path that is unneeded in the processing of IDLE signals. While analog and/or digital circuitry in the local receiver path is powered down, the local transmitter is maintained in an operational state that prevents any compromise of the link established with the remote link partner. From the energy saving state, the local receiver can be awakened at step 508 to do a periodic refresh or to process a non-idle signal.

As has been described, the principles of the preset invention enable power savings in many links that include a link partner that is not configured for energy efficiency. This mechanism thereby improves energy efficiency across the network without being dependent on a full migration to fully-compatible energy-efficient devices.

As would be appreciated, the principles of the present invention are applicable to a wide variety of data communications systems' standards such as IEEE 802.3. The principles of the present invention can also be applied to a variety of other wireline and wireless applications.

In general, the EEE control policy can be implemented across various control layers. The EEE control policy need not be hardcoded, but can be adaptive and response to some form of inter-layer control. As would be appreciated, the principles of the present invention can also be applied to full duplex scenarios as well.

These and other aspects of the present invention will become apparent to those skilled in the art by a review of the preceding detailed description. Although a number of salient features of the present invention have been described above, the invention is capable of other embodiments and of being practiced and carried out in various ways that would be apparent to one of ordinary skill in the art after reading the disclosed invention, therefore the above description should not be considered to be exclusive of these other embodiments. Also, it is to be understood that the phraseology and terminology employed herein are for the purposes of description and should not be regarded as limiting.

What is claimed is:

1. A physical layer communication device, comprising:
    a receiver;
    control policy logic that powers down at least part of said receiver in response to a control signal; and
    a monitoring module that detects a presence of a sequence of a plurality of Ethernet idle signals that are received from a remote device at said receiver, wherein said sequence of said plurality of Ethernet idle signals are transmitted by said remote device when said remote device is in an active communication state for data communication, said Ethernet idle signals being designed to enable said receiver to maintain clock synchronization during said active communication state and being transmitted by said remote device during said active communication state whenever said remote device has no data or control information to transmit to the physical layer communication device,
    wherein said detected presence of said sequence of said plurality of Ethernet idle signals are monitored relative to a programmable threshold to generate said control signal.

2. The physical layer communication device of claim 1, wherein said control policy logic powers down all receiver channels.

3. The physical layer communication device of claim 1, wherein said control policy logic powers down less than all receiver channels.

4. The physical layer communication device of claim 1, further comprising a transmitter that remains on when said at least part of said receiver is powered down.

5. The physical layer communication device of claim 1, wherein said control policy logic powers up said at least part of said receiver when said monitoring module detects a presence of a non-idle signal.

6. The physical layer communication device of claim 1, wherein said programmable threshold is determined using fuzzy logic.

7. A method performed by a physical layer communication device, comprising:
    receiving a transmission of data from a link partner while said link partner and the physical layer communication device are in an active communication state, said active communication state supporting data transmission;
    monitoring, by a monitoring module in the physical layer communication device, a sequence of a plurality of idle signals received at a receiver of the physical layer communication device relative to a programmable threshold, said idle signals being transmitted by said link partner during said active communication state whenever said remote device has no data or control information to transmit to the physical layer communication device;
    powering down at least part of said receiver based on a control signal produced by said monitoring; and
    maintaining a transmitter of the physical layer communication device in a fully powered state that supports data transmission while said at least part of said receiver is powered down.

8. The method of claim 7, further comprising generating said control signal using an adaptive control mechanism.

9. The method of claim 7, further comprising powering up said at least part of said receiver when data or control information is received at said receiver.

10. A method in a local physical layer communication device, comprising:
    receiving a sequence of a plurality of Ethernet idle signals from a remote physical layer communication device while said remote physical layer communication device is in a fully powered state, said Ethernet idle signals being transmitted by said remote physical layer communication device during said fully powered state whenever said remote physical layer communication device has no data or control information to transmit to the physical layer communication device;
    monitoring said received sequence of said plurality of Ethernet idle signals relative to a programmable threshold; and
    powering down at least part of a receiver of the local physical layer communication device to conserve power based on a control signal generated using said monitoring.

11. The method of claim 10, wherein said powering down comprises powering down all channels of said receiver.

12. The method of claim 10, wherein said powering down comprises powering down less than all channels of said receiver.

13. The method of claim 10, further comprising maintaining a transmitter of the local physical layer communication device in a fully powered state while said at least part of said receiver is powered down.

14. The method of claim 10, further comprising powering up said at least part of said receiver when data or control information is received from said remote physical layer communication device.

15. The method of claim 10, further comprising adapting said programmable threshold using fuzzy logic.

* * * * *